(12) United States Patent
Le Roux et al.

(10) Patent No.: US 8,783,169 B2
(45) Date of Patent: Jul. 22, 2014

(54) SYSTEM, METHOD AND APPARATUS FOR PROCESSING FOOD PRODUCTS

(75) Inventors: Anton Schutte Le Roux, Randfontein (ZA); Roy Andrew Johnston, Parkrand (ZA); Hermann August Schultz, Melkbosstrand (ZA); Daniel Roux, Durbanville (ZA); Taylor Uys, Durbanville (ZA)

(73) Assignee: Freddy Hirsch Group (Proprietary) Limited, Maitland, Cape Town (ZA)

( * ) Notice: Subject to any disclaimer, the term of this patent is extended or adjusted under 35 U.S.C. 154(b) by 231 days.

(21) Appl. No.: 13/262,360

(22) PCT Filed: Apr. 1, 2010

(86) PCT No.: PCT/IB2010/051436
§ 371 (c)(1),
(2), (4) Date: Dec. 14, 2011

(87) PCT Pub. No.: WO2010/113137
PCT Pub. Date: Oct. 7, 2010

(65) Prior Publication Data
US 2012/0082776 A1 Apr. 5, 2012

(30) Foreign Application Priority Data
Apr. 1, 2009 (ZA) .................. 2009/02273

(51) Int. Cl.
*A47J 37/12* (2006.01)
*A23B 4/00* (2006.01)
*A23L 1/00* (2006.01)

(52) U.S. Cl.
USPC ............... 99/404; 99/516; 99/517; 426/506; 426/509

(58) Field of Classification Search
USPC ............... 99/404, 405, 406, 407, 409, 443 C; 426/524; 62/266
See application file for complete search history.

(56) References Cited

U.S. PATENT DOCUMENTS

| 2,793,582 A | 5/1957 | Rothe et al. |
| 3,368,363 A | 2/1968 | Alaburda et al. |

(Continued)

FOREIGN PATENT DOCUMENTS

| EP | 0 372 354 | 6/1990 |
| FR | 1 053 009 | 1/1954 |

OTHER PUBLICATIONS

International Search Report mailed Aug. 11, 2010 (3pages).

*Primary Examiner* — Dana Ross
*Assistant Examiner* — Lindsey C Teaters
(74) *Attorney, Agent, or Firm* — Brian J. Colandreo; Michael T. Abramson; Holland & Knight, LLP

(57) ABSTRACT

A food processing system 10 comprising a cooking apparatus 12 and a cooling apparatus 14. The apparatus 12, 14 are similar and are configured for processing sausages which have casings which are fragile and easily ruptured. The apparatus 12 comprises a processing vessel 16 for containing a cooking liquid, a feed chute 18, a guide means in the form of jets 56.1, 56.2 and 56.3, a screw conveyer 22 and a discharge conveyer 24. The sausages are fed into the vessel 16 via feed chute 18. The jets 56.1, 56.2 and 56.3 guide the sausages into optimal positions relative to the screw conveyer 22 which conveys the sausages to the discharge conveyer 24. The jets 56.1, 56.2 and 56.3 also separate the sausages ensuring that the sausages do not "bunch up" when deposited into the vessel 16 and also ensure that the sausages are aligned and travel in a direction substantially parallel to the axis of rotation of the screw conveyer 22 thereby to reduce impact forces applied to the sausages by the conveyer 22.

10 Claims, 10 Drawing Sheets

(56) References Cited

U.S. PATENT DOCUMENTS

| | | |
|---|---|---|
| 3,410,101 A | 11/1968 | Morris, Jr. |
| 2006/0225438 A1* | 10/2006 | Morris et al. .................... 62/64 |
| 2008/0286435 A1* | 11/2008 | Fukumori et al. ............ 426/618 |

* cited by examiner

SYSTEM, METHOD AND APPARATUS FOR PROCESSING FOOD PRODUCTS

RELATED APPLICATIONS

The subject application is a U.S. National Stage Application of International Application No. PCT/IB2010/051436, filed on 1 Apr. 2010, which claims the priority of South African Patent Application No.: 2009/02273, filed on 1 Apr. 2009, the contents of which are herein incorporated by reference in its entirety.

FIELD OF INVENTION

The invention relates to a system, method and apparatus for processing food products of predetermined lengths having elongate configurations, particularly of a type but not necessarily limited to, food products which each comprise an elongate minced foodstuff filler encased in an edible outer casing, a typical example of which includes a sausage comprising a minced meat filler encased in an edible outer casing having an alginate base. Other suitable casing materials may include a collagen casing, a casing comprising a mixture of collagen and alginate, a pig gut casing or the like.

Any reference herein to a "food product" must be interpreted to mean a food product having an elongate configuration, of the type described hereinabove. Any reference herein to "processing" food products must be interpreted to mean either cooking the food product or chilling the food product after cooking thereof.

BACKGROUND TO INVENTION

Sausages comprising a minced meat filler encased in a casing, are known. Traditionally, the casing for such sausages is pig gut. However, the use of a sausage casing of a vegetable gel such as alginate is also known. Such sausage casings are typically co-extruded with the filler in a co-extrusion apparatus. The sausages produced in this manner are produced in predetermined lengths, with the ends pinched closed and cut so as to seal off the ends of the filler with the vegetable gel casing.

It is an object of the present invention to provide a process, system and apparatus for preparing food products of the abovementioned type.

SUMMARY OF INVENTION

According to a first aspect of the invention there is provided a processing apparatus for processing food products, comprising:

an elongate processing vessel having a first end and a second end, for containing a processing liquid in which the food products can be processed;

feeding means disposed at the first end of the processing vessel, the feeding means being configured for feeding the food products into the processing vessel at the first end thereof;

a screw conveyor having a helical screw feed, which is located within the processing vessel for conveying the food products through the processing liquid from the first end to the second end of the processing vessel;

guide means which is operable to guide the food products into optimal positions relative to the helical screw feed of the screw conveyor, at which the food products can be picked up by the screw conveyer; and discharge means which are disposed at the second end of the processing vessel for removing the food products from the processing vessel and for conveying the food products to a location remote therefrom.

The feeding means may comprise a feed chute including an inclined feed channel having a lower end disposed above the processing liquid at the first end of the processing vessel and an upper end into which the food products are deposited. The upper end of the feed chute may have an inlet opening through which processing liquid can be introduced into the feed channel for assisting in conveying food products towards the lower end thereof. The feed channel may defines a longitudinal axis and may be dimensioned and configured so as to guide a single row of food products along the feed channel from the upper end to the lower end thereof in an arrangement wherein longitudinal axes of the food products defined along the lengths thereof, are aligned with one another and with the longitudinal axis of the feed channel.

The screw conveyor may comprise a central shaft and the helical screw feed in the form of a helical screw extending therefrom, having an upstream end and a downstream end, the helical screw conveyor being disposed within the processing vessel such that the upstream end of the helical screw is spaced from the first end of the processing vessel so as to be disposed downstream of the position at which the food products are introduced into the processing vessel via the feed chute, in use.

The guide means may be in the form of at least one liquid jet disposed at the first end of the processing vessel, the liquid jet being operable to direct a stream of the processing liquid at the food products so as to guide the food products into optimal positions relative to the helical screw feed of the screw conveyer.

The discharge means may be in the form of a belt conveyor having gripping formations for gripping the food products. The belt conveyor may be inclined and may have a lower end submerged within the processing liquid within the processing vessel and an upper end disposed above the surface of the processing liquid within the processing vessel.

The processing apparatus may be in the form of a cooking apparatus for cooking food products, and the processing vessel may be in the form of a cooking vessel for containing a processing liquid in the form of a cooking liquid.

The processing apparatus may be in the form of a cooling apparatus for cooling food products, and the processing vessel may be in the form of a cooling vessel for containing a processing liquid in the form of a cooling liquid.

In an alternative embodiment of the processing apparatus in accordance with the first aspect of the invention, the screw conveyer may be in the form of a rotatable flighted drum. The rotatable flighted drum may comprise a cylindrical drum wall having a first end wall defining an inlet opening leading into the drum and an opposite second end wall defining an exit opening leading out of the drum, and the helical screw feed in the form of a helical screw extending inwardly from an inner side of the drum wall, the helical screw having an upstream end located adjacent the inlet opening and a downstream end located adjacent the exit opening.

The guiding means may comprise a first guiding formation extending from the upstream end of the helical screw of the rotatable flighted drum at a position adjacent the inlet opening for guiding the displacement of the food products entering into the drum through the inlet opening to a first deposit zone located between a first pair of spaced adjacent helical screw portions of the helical screw at the upstream end thereof; and a second guiding formation extending from the helical screw of the rotatable flighted drum at a position downstream of the first guiding formation for guiding the displacement of the food products entering into the drum through the inlet opening to a second deposit zone located between a second pair of spaced adjacent helical screw portions of the helical screw disposed downstream of the first pair of adjacent helical screw portions of the helical screw; the first and second guiding formations being configured such that, in use, rotation of the flighted drum in a predetermined direction of the flighted drum, provides for alternately depositing of the food products into the first deposit zone and the second deposit zone in an alternating fashion.

The discharge means may be in the form of a discharge formation extending from the helical screw of the screw conveyer at the downstream end thereof, the discharge formation being operable when the flighted drum is rotated, in use, to lift the food products out of the processing liquid and deposit the food products at a location adjacent the exit opening from which the food products exit the flighted drum via the exit opening of the flighted drum.

The invention extends to a food processing system for processing food products, which includes the processing apparatus in accordance with the first aspect of the invention in the form of the cooking apparatus and the processing apparatus in accordance with the first aspect of the invention in the form of the cooling apparatus. More particularly, the discharge means of the cooking apparatus may be operable to convey the food products to the feed means of the cooling apparatus.

According to a second aspect of the invention there is provided a method of processing food products including:
- providing an elongate processing vessel having a first end and a second end, for containing a processing liquid in which the food products can be processed;
- introducing the food products into the processing liquid in the processing vessel at positions near the first end of the processing vessel;
- conveying the food products within the processing liquid from the first end to the second end of the processing vessel using a screw conveyer having a helical screw feed;
- guiding the food products into optimal positions relative to the helical screw feed of the screw conveyer; and
- removing the food products from the processing liquid of the processing vessel when the food products reach the second end thereof.

The method may be specifically adapted for processing food products comprising a minced foodstuff filler encased in a casing having one of a collagen base, an alginate base and a casing comprising a mixture of alginate and collagen.

The method may include introducing the food products into a processing vessel in the form of a cooking vessel for cooking the food products and thereafter delivering the cooked food products, cooked within the cooking vessel, into a processing vessel in the form of a cooling vessel for cooling the cooked food products.

The method may be implemented by means of the processing apparatus as described hereinabove in accordance with the first aspect of the invention.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DETAILED DESCRIPTION OF THE DRAWINGS

Figure 4:
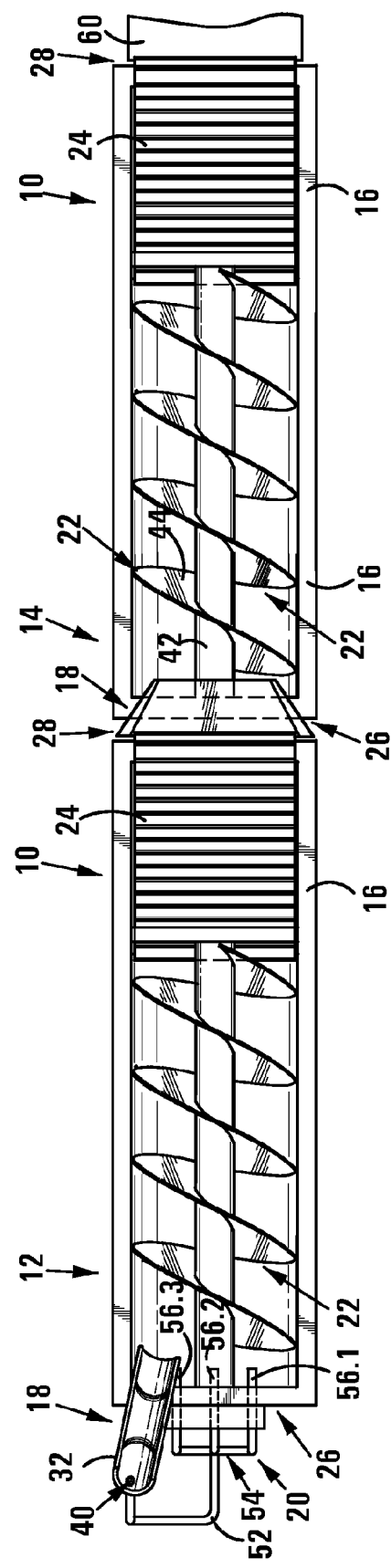
FIG. 4 shows a fragmentary top plan view of a food processing system for processing food products, in accordance with the invention.
Figure 5:
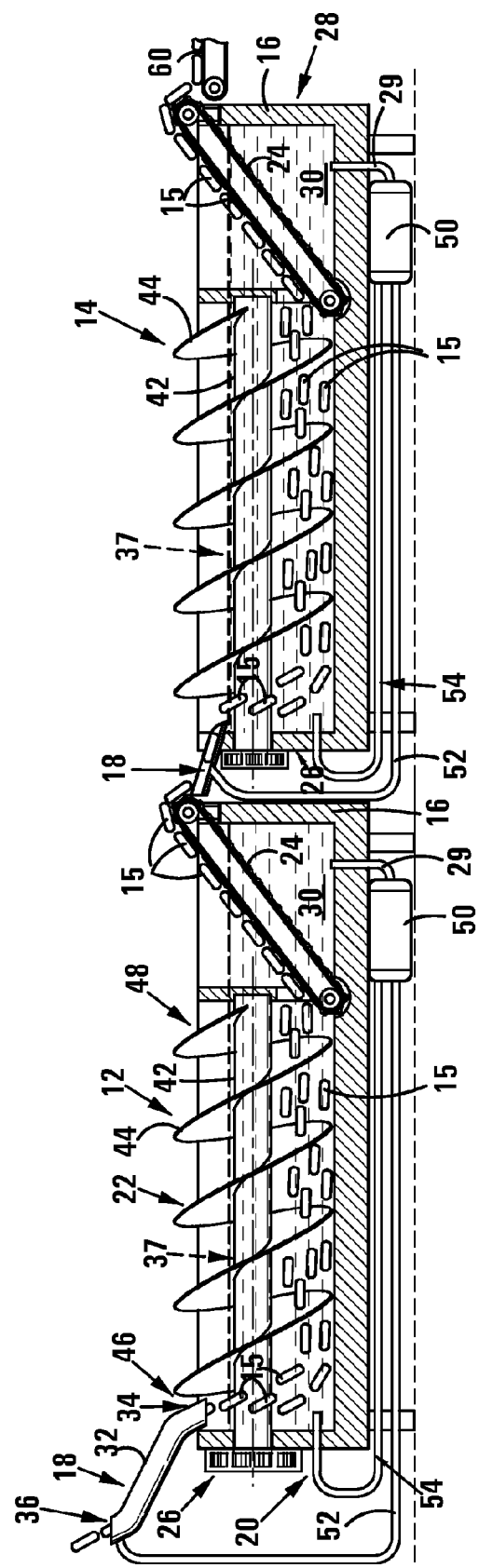
FIG. 5 shows a fragmentary part-sectional side view of the food processing system of FIG. 4.
Figure 6:
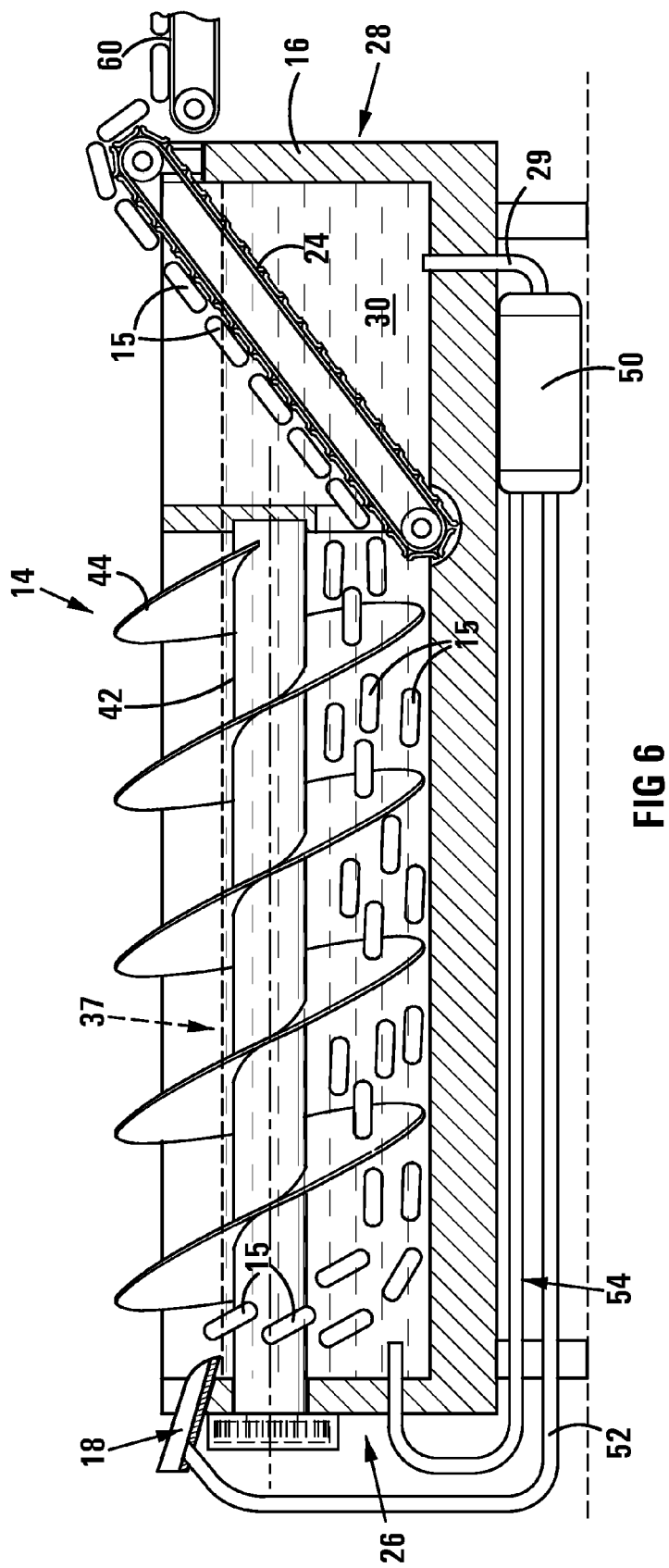
FIG. 6 shows a part-sectional side view of a processing apparatus in accordance with the first aspect of the invention which is configured for cooling food products.

With reference to FIGS. 4 and 5 of the drawings, a food processing system in accordance with the invention is designated generally by the reference numeral 10. The food processing system 10 comprises, broadly, a first processing apparatus in accordance with the invention, which is in the form of a cooking apparatus 12 and a second processing apparatus in accordance with the invention, which is in the form of a cooling apparatus 14. The food processing system 10 is specifically adapted for cooking food products in the form of sausages 15 comprising a raw minced meat filler encased in an edible outer casing having a collagen base, an alginate base, or a base comprising a mixture of alginate and collagen. The sausages 15 are prepared in a co-extrusion process wherein the sausage casings are co-extruded with the fillers in a co-extrusion apparatus such as the Handtmann ConPro co-extrusion system supplied by Handtmann, Germany. The sausages produced by the Handtmann co-extrusion apparatus are produced in predetermined lengths wherein the ends of the individual sausages 15 are pinched closed and cut so as to seal off the ends of the filler with the casing.

Figure 1:
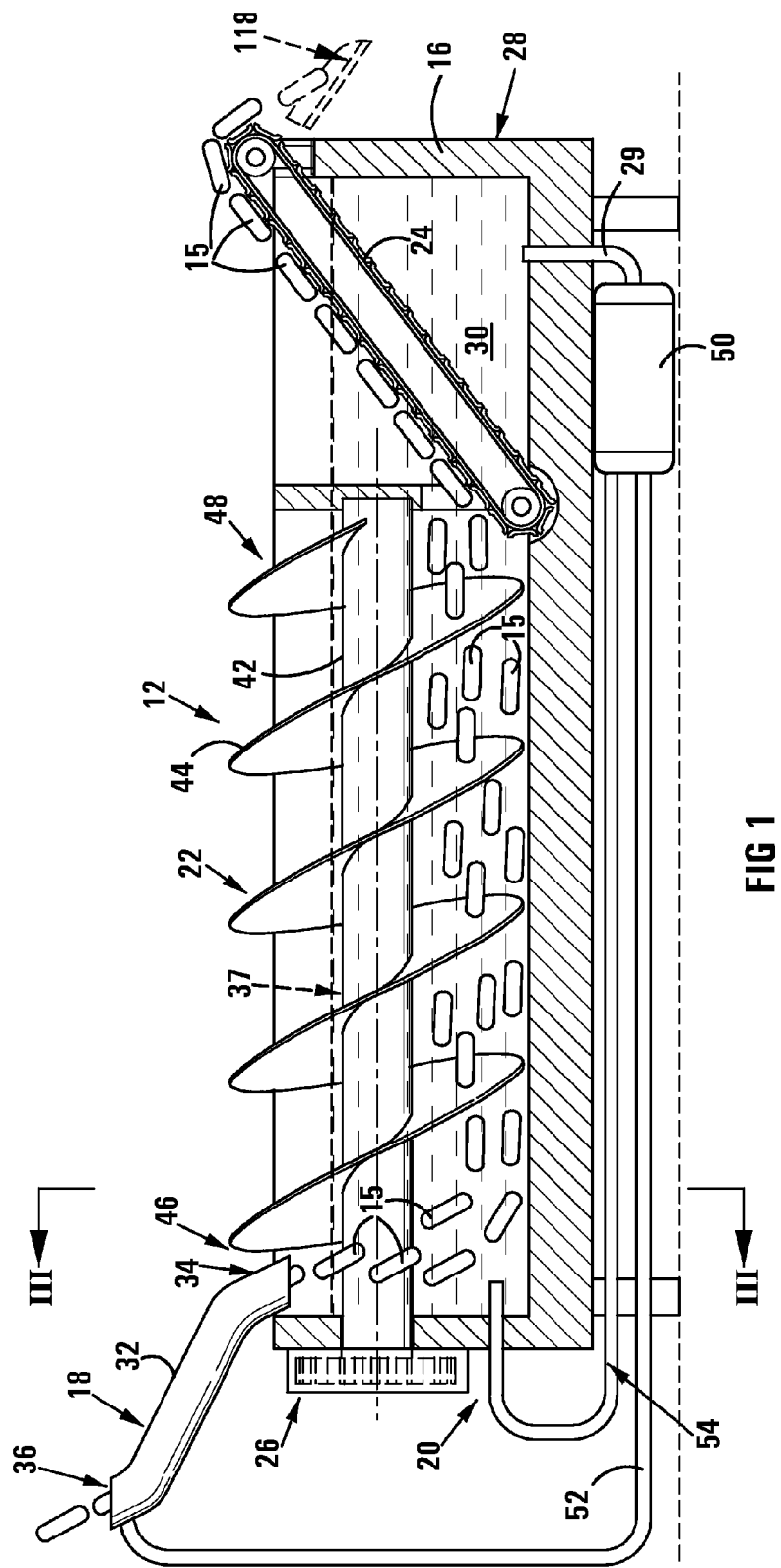
FIG. 1 shows a part-sectional side view of a processing apparatus for preparing food products, in accordance with the first aspect of the invention.
Figure 2:
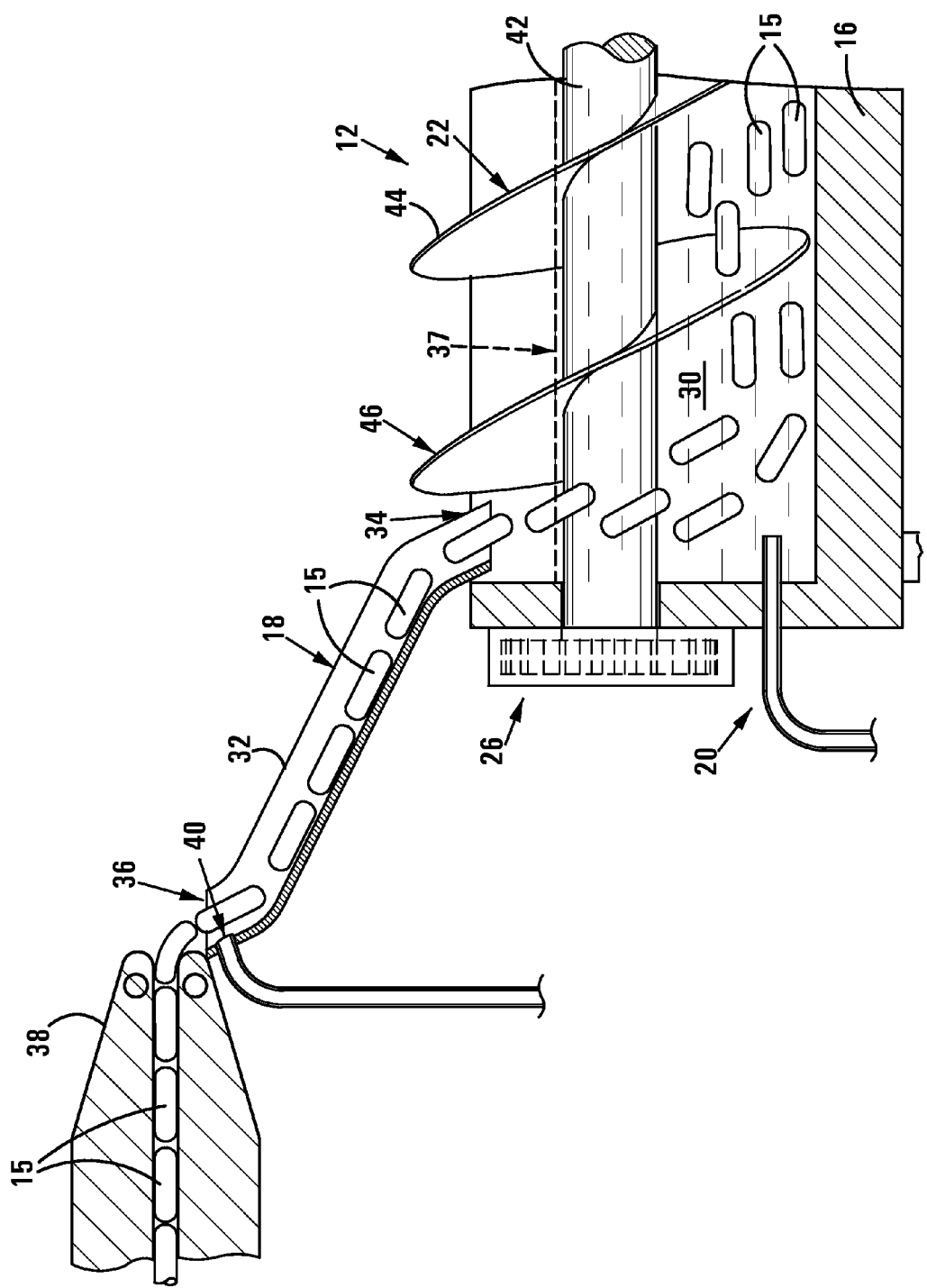
FIG. 2 shows an enlarged, fragmentary part-sectional side view of the processing apparatus of FIG. 1, illustrating the manner in which food products enter the processing vessel of the processing apparatus.
Figure 3:
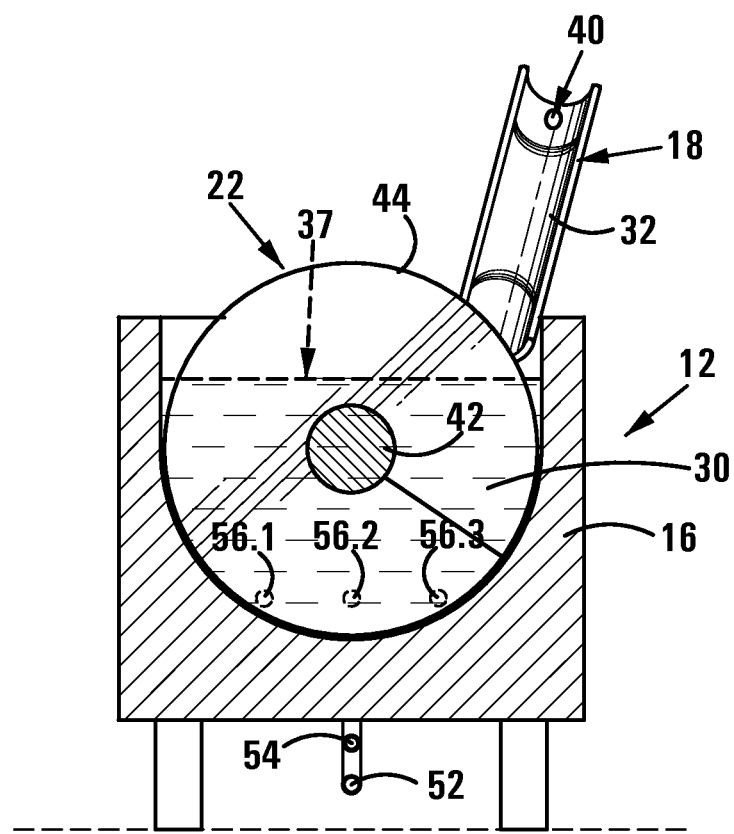
FIG. 3 shows a sectional end view of the processing apparatus of FIG. 1, sectioned along section line III-III of FIG. 1.

The cooking apparatus 12 is illustrated on its own in FIGS. 1, 2 and 3 of the drawings. The cooking apparatus comprises, broadly, a processing vessel in the form of a cooking vessel 16, feeding means in the form of a feed chute 18, guiding means in the form of a liquid guiding system 20, a screw conveyor 22 and discharge means in the form of a discharge belt conveyor 24.

The cooking vessel 16 has a first end 26 and a second end 28. The cooking vessel 16 is filled with a processing liquid in the form of a cooking liquid 30. The cooking liquid 30 is in the form of an aqueous solution containing predetermined amounts of calcium chloride and acetic acid which assists in stabilising the colour of the sausages during the cooking process. Typically, a colouring agent and a flavouring agent is added to the aqueous solution for imparting colour and flavour to the sausages 15 during the cooking process.

The feed chute 18 is in a form of an inclined feed channel 32 which has a lower end 34 disposed above a surface 37 of the cooking liquid 30 at the first end 26 of the cooking vessel 16 and an upper end 36 into which the sausages 15 are deposited after being discharged from a Handtmann co-extrusion apparatus 38. The upper end 36 of the feed channel 32 has an inlet opening 40 through which cooking liquid 30 from the cooking vessel 16 is introduced into the feed channel 32 for conveying sausages 15 towards the lower end thereof. The feed channel 32 defines a longitudinal axes and is dimensioned and configured so as to guide a single row of sausages 15 along the feed channel 32 from the upper end 36 to the lower end 34 thereof in an arrangement wherein the longitudinal axes of the sausages 15 defined along their lengths, are substantially aligned with one another and with the longitudinal axis of the feed channel 32.

The screw conveyor 22 comprises a central shaft 42 which is rotatably supported at opposite ends thereof relative to the cooking vessel 16 and a helical screw 44 which extends radially outwardly from the shaft 42. More specifically, the helical screw 44 has an upstream end 46 and a downstream end 48, with the screw conveyor 22 being located within the cooking vessel 16 such that the upstream end 46 of the helical screw 44 is spaced from the first end 26 of the cooking vessel 16 so as to be disposed downstream of the position at which the sausages 15 are introduced into the cooking vessel 16 via the feed chute 18, in use.

The belt conveyor 24 is located at the second end 28 of the cooking vessel 16 and is inclined so as to have a lower end which is submerged within the cooking liquid within the cooking vessel 16 and an upper end which is disposed above the surface 37 of the cooking liquid 30. The belt conveyor 24 comprises a number of interconnected horizontally-extending slats which are shaped so as to provide gripping formations for gripping the sausages 15 as the sausages 15 are conveyed by the belt conveyor.

The liquid guiding system 20 comprises a motor-driven pump 50 and a number of conduits connected thereto. More specifically, the liquid displacement system 20 includes a conduit 52 which extends between the pump 50 and the inlet opening 40 in the feed chute 18, for conveying cooking liquid 30 from the cooking vessel 16 to the feed chute. As such, the pump 50 is connected to an outlet opening 29 within the cooking vessel 16 allowing a predetermined amount of cooking liquid 30 to be pumped by the pump from the cooking vessel 16 to the feed chute, with the cooking liquid thereafter being returned to the cooking vessel 16 after flowing down the feed chute.

The liquid guiding system further includes a system of pipes 54 which are connected to the pump 50 for conveying cooking liquid from the cooking vessel 16 and which terminate in three jets 56.1, 56.2 and 56.3 which are disposed below the surface 37 of the cooking liquid within the cooking vessel 16 at the first end 26 of the cooking vessel 16. The jets 56.1, 56.2 and 56.3 are configured so as to direct streams of the cooking liquid in a direction from the first end 26 of the cooking vessel 16 to the second end 28 thereof so as to propel the sausages 15 for initiating displacement of the sausages 15 within the cooking vessel 16 towards the second end 28 thereof and also to align the sausages 15 within the cooking vessel 16 such that the longitudinal axes of the sausages 15 are aligned with the axis of rotation of the screw conveyor 22.

The jets 56.1, 56.2 and 56.3 provide for positioning of the sausages at locations adjacent the upstream end of the screw conveyer 22. The sausages are relatively fragile and susceptible to rupturing of their casings if contacted too vigorously by the helical screw 44. The jets thus act on the sausages ensuring that the sausages are already travelling in a direction substantially parallel to the axis of rotation of the screw conveyer when they are contacted and acted upon by the helical screw 44. By already moving in the direction of displacement when acted upon by the screw conveyer, prior to being contacted by the screw conveyer, the impact forces applied to the sausages by the helical screw 44 are reduced thereby reducing the likelihood of any of the sausages rupturing. The jets also serve to align the longitudinal axes of the sausages with the axis of rotation of the screw conveyer which further assists in the "pick up" of the sausages by the helical screw.

In addition to the abovementioned benefits of the jets 56.1, 56.2 and 56.3, the jets also provide for the separation of the sausages after being deposited into the cooking liquid by the feed chute. The sausages tend to "bunch up" after being deposited into the cooking vessel and need to be separated prior to being "picked up" by the helical screw 44. If the sausages are not separated so as to become more fluid, the resistance to movement of the individual sausages caused by other adjacent sausages, when impacted upon by the helical screw 44, would result in the sausages offering too much resistance to the rotation of the helical screw thereby resulting in a relatively high risk of rupturing of the sausages.

In use, the applicant envisages that in a typical cooking process for cooking raw sausages 15 as mentioned above, the cooking liquid 30 will be heated to a temperature in the region of 85° C. and the length of the cooking vessel 16 and the speed of rotation of the screw conveyor 22 will be such that the sausages 15 will be immersed within the cooking liquid 30 for approximately 10 to 12 minutes before being discharged from the cooking liquid 30 by means of the belt conveyor 24. The Applicant envisages that the screw conveyor 22 may be a variable speed screw conveyor wherein the speed of rotation of the screw can be varied as desired.

After exiting the cooking apparatus 12, the sausages 15 enter the cooling apparatus 14. The cooling apparatus 14 is similar to the cooking apparatus 12 with a difference being that the vessel 16 of the cooling apparatus 14 is in the form of a cooling vessel 16 which is filled with processing liquid in the form of cooling liquid 130. Furthermore, the cooling apparatus 14 includes a feed chute 118 into which sausages 15 are deposited by the belt conveyor 24 of the cooking apparatus 12, wherein the feed chute 118 has a relatively wider support surface for supporting sausages than is the case with the feed chute 18, which matches the width of the belt conveyor 24 of the cooking apparatus 12. As such, features of the cooling apparatus 14 which are the same as and/or similar to those of the cooking apparatus 12 are depicted by the same and/or similar reference numerals.

The cooling liquid 130 in the cooling vessel 16 is in the form of brine which is maintained at a temperature of close to 0° C. The sausages 15 are immersed in the cooling vessel 16 for approximately 15-20 minutes. As for the cooking vessel 16, the length of the cooling vessel 16 and the speed of rotation of the screw conveyor 22 is such that the sausages 15 are immersed in the cooling liquid 130 for the required length of time. The Applicant envisages that the screw conveyor 22 may be a variable speed screw conveyor wherein the speed of rotation of the screw can be varied as desired. After exiting the cooling liquid 130, the sausages 15 are deposited onto a belt conveyor 60 by means of the conveyor 24, on which the sausages are air-dried prior to packaging.

Figure 7:
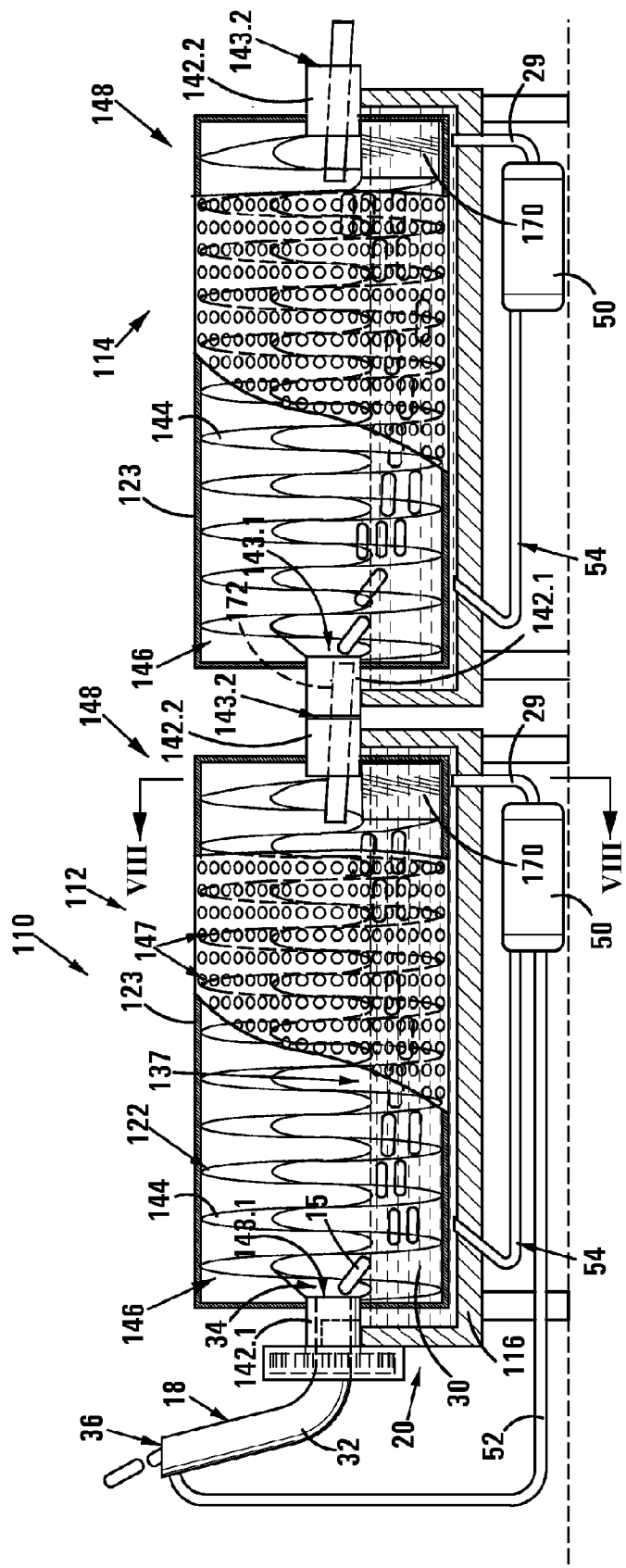
FIG. 7 shows a part-sectional side view of another embodiment of a processing apparatus for processing food products in accordance with the invention.
Figure 8:
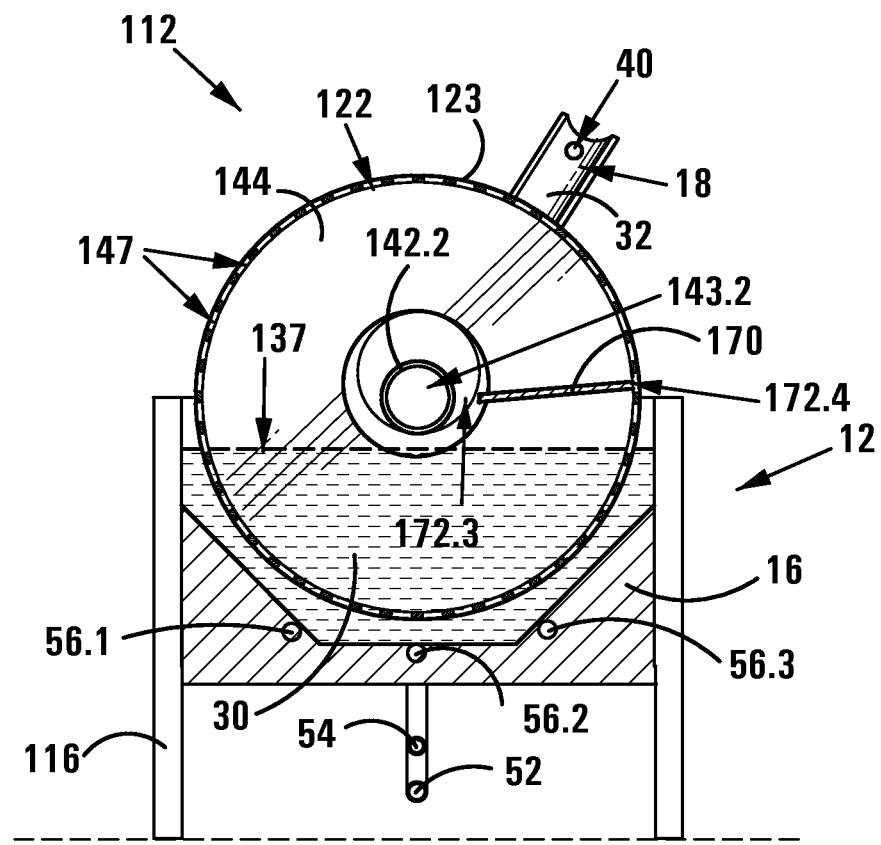
FIG. 8 shows a sectional end view of the processing apparatus of FIG. 7, sectioned along section lines VIII-VIII of FIG. 7.

With reference to FIGS. 7, 8 and 9 of the drawings, a second embodiment of a food processing system in accordance with the invention, is designated generally by the reference numeral 110. The processing system 110 is similar to processing system 10. As such, features of the processing system 110 which are the same as and/or similar to those of processing system 10, are designated by the same as and/or similar reference numerals in FIGS. 7 and 8. What is stated above in respect of processing system 10 applies generally to processing system 110. The processing system 110 comprises a cooling apparatus 114 and cooking apparatus 112 which is similar to the cooking apparatus 12, except that the screw conveyor 22 of cooking apparatus 12 is replaced by a rotatable flighted drum 122 and the guide means, discharge means and feeding means differ from those described with reference to the apparatus 12.

The rotatable flighted drum 122 comprises a cylindrical drum wall 123 having two opposite end walls which each define an opening 143 into the drum and a pair of hollow stub-axles 142.1 and 142.2 which each project outwardly from a different one of the ends of the drum wall. The stub axles 142.1 and 142.2 are rotatably supported so as to provide for rotation of the drum. The stub-axles 142.1 and 142.2 define internal passages which are in register with the openings 143.1 and 143.2, respectively, in the drum and along which sausages 15 can enter and exit the drum. In use, sausages 15 enter into the drum 122 via inlet opening 143.1 and exit the drum 122 via exit opening 143.2. More specifically, the drum wall 123 defines a helical screw 144 which extends radially inwardly from the drum wall 123 from an upstream end 146 of the helical screw 144 to a downstream end 148 thereof, with the helical screw 144 located within the cooking vessel 16 with the upstream end 146 of the helical screw 144 spaced from the first end 26 of the cooking vessel 16 adjacent inlet opening 143.1 and the downstream end 148 disposed adjacent exit opening 143.2. Holes 147 defined in the drum wall 123 provide for flow of the cooking liquid 30 which passes freely between an inner side and an outer side of the drum 123.

The guide means of the cooking apparatus 112 comprises a first guiding formation in the form of a first web 162 extending between a first screw portion 160.1 on the upstream end 146 of the helical screw 144 and the stub axle 142.1 and a second guiding formation in the form of a second web 164 extending between the stub axle 142.1 and a second screw portion 160.2 of the helical screw at a position downstream of the first web 162.

Figure 9A:
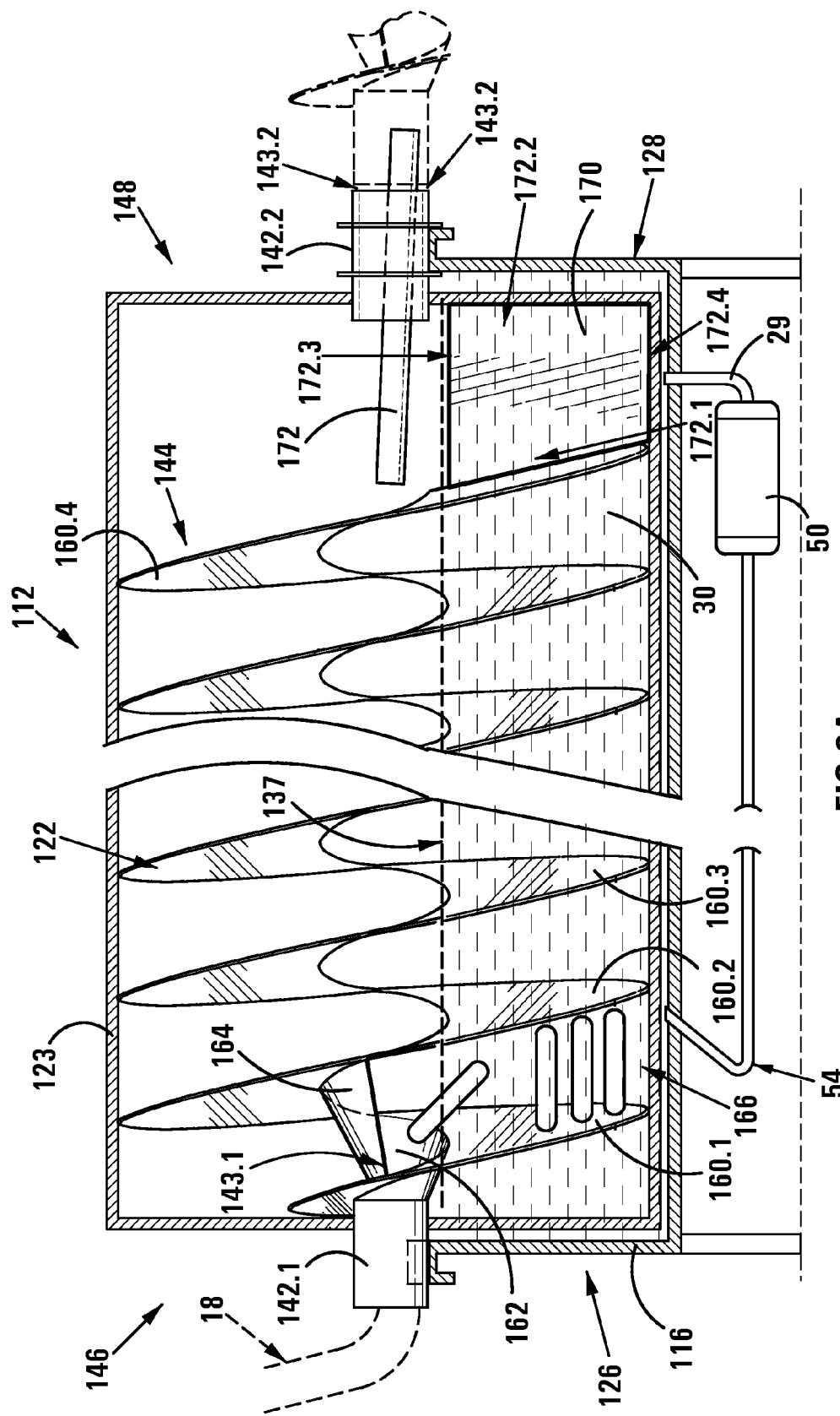
FIG. 9A shows an enlarged, fragmentary and part sectional side view of a helical formation of the processing apparatus of FIG. 7.
Figure 9B:
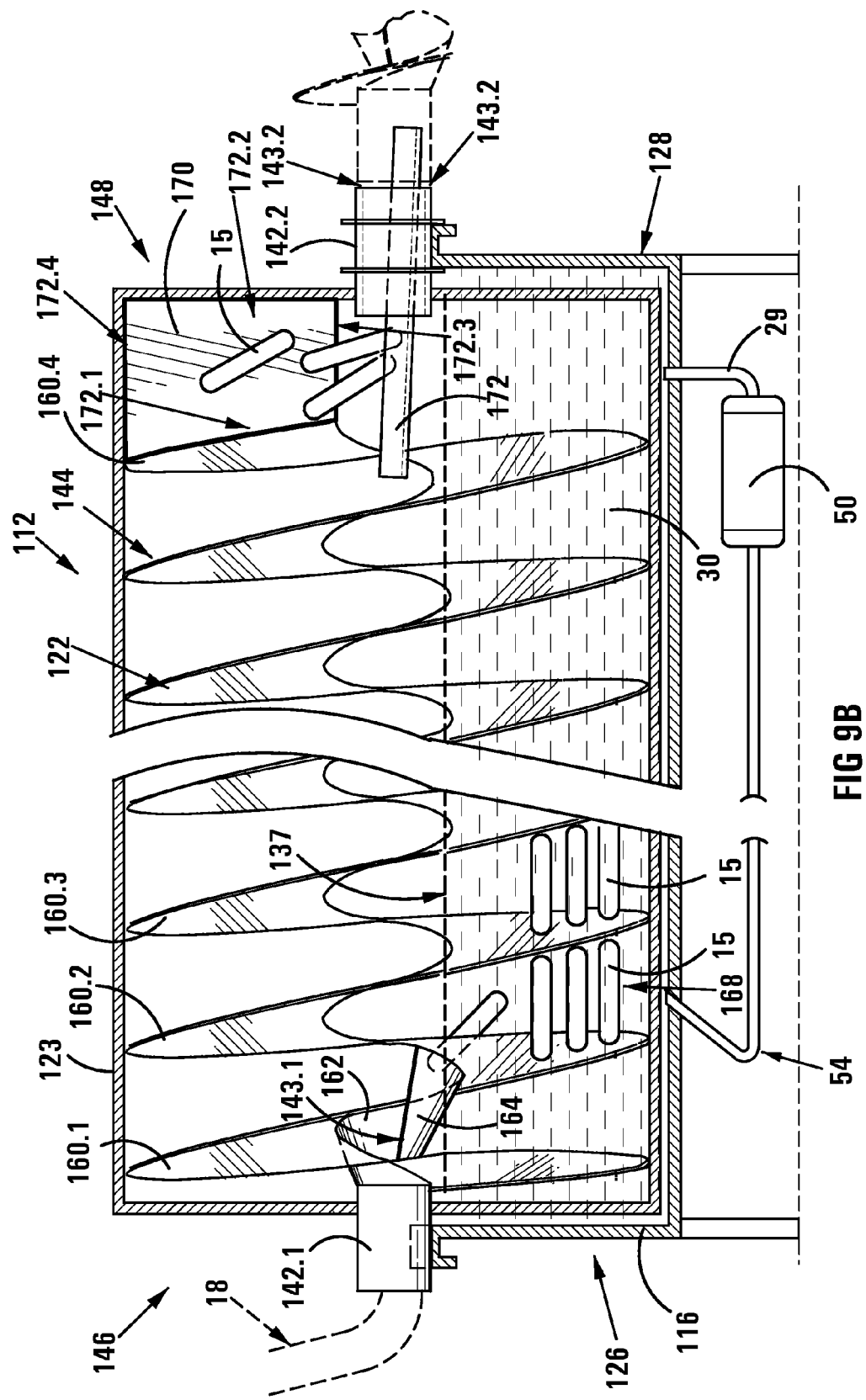
FIG. 9B shows an enlarged, fragmentary and part sectional side view of the helical screw of the processing apparatus of FIG. 7, shown with the helical screw in a position rotated 180° from the position shown in FIG. 9A.

The guide means of the cooking apparatus 112 further comprises jets 56.1, 56.2 and 56.3. The jets 56.1, 56.2 and 56.3 are positioned as shown in FIGS. 9A and 9B such that the jets 56.1, 56.2 and 56.3 are operable to direct a stream of the processing liquid at the sausages 15 so as to guide the sausages into optimal positions relative to the helical screw 144 as will be explained in more detail below.

The discharge means of the cooking apparatus 112 comprises a downwardly sloping discharge chute 172 and a discharge formation in the form of a discharge plate 170 extending substantially perpendicularly from the downstream end of a major face of a last screw portion 160.4 of the helical screw 144. More particularly, the plate 170 has an end 172.1 connected to the major face of the helical screw portion 160.4, an opposite end 172.2 connected to the end wall of drum wall 123, an outer end 172.4 connected to drum wall 123 and a free inner end 172.3.

In use, the flighted drum 122 is rotated in a predetermined direction such that sausages entering into the drum through the inlet opening 143.1 are guided by the first web 162 such that the sausages are deposited into a first deposit zone 166 located between the first pair of adjacent helical screw portions 160.1, 160.2. As the flighted drum is rotated, sausages entering the drum through the inlet opening 143.1 are guided by the second web 164 such that the sausages are deposited into a second deposit zone 168 located between a second pair of adjacent helical screw portions 160.2, 160.3 disposed downstream of the first pair of helical screw portions 160.1, 160.2.

In use, rotation of the drum provides for alternately depositing of the sausages into the first deposit zone 166 and the second deposit zone 168 in an alternating fashion, thereby to provide for the substantially equal distribution of sausages between the first deposit zone 166 and the second deposit zone 168. The Applicant believes that this arrangement provides for the positioning of sausages at optimal positions at which the sausages are picked up by the helical screw in a manner which reduces the possibility of bunching up of the sausages and reduces the possibility of rupturing of the casings of the sausages.

In use, the jets 56.1, 56.2 and 56.3 are operable to direct a stream of processing liquid at the sausages 15 which passes through holes 147 defined in drum wall 123 so as to apply urging forces to the sausages 15. The urging forces have a vertical vector component acting on the sausages 15 thereby guiding the sausages 15 to rise towards the surface 137 of the cooking liquid and a horizontal vector component acting on the sausages thereby urging and guiding the displacement of sausages 15 from the first end 126 to the second end 128 of the cooking vessel 116. Furthermore, the urging forces provide for the separation of the sausages after being deposited into the cooking liquid to prevent the "bunch up" of the sausages.

In use, rotation of the helical screw 144 causes the plate 170 to be displaced in a rotational displacement about an axis of rotation of the helical screw 144. The plate 170 is thus operable to lift sausages 15 out of the cooking liquid and deposit the sausages into the discharge chute 172 when the plate 170 reaches its highest point in its rotation. The sausages then exit the apparatus 112 via the discharge chute 172 which slopes downwardly through the exit opening 142.2.

With reference to FIG. 7, the processing system 110 includes a cooling apparatus 114 which is similar to cooling apparatus 14, except that the screw conveyer 22 of cooling apparatus 14 is replaced by a flighted drum which is identical to the flighted drum 122 described above in relation to the cooking apparatus 112.

The application envisages that the food processing system 10, 110, provides a continuous process of cooking the sausages in the cooking apparatus 12, 112 and immediately thereafter cooling the sausages in the cooling apparatus 14, 114.

It will be appreciated that the shape and configuration of the cooking apparatus 12, 112 and of the cooling apparatus 14, 114, may vary considerably while still embodying the essential features as defined hereinabove.

The invention claimed is:

1. A processing apparatus for processing food products, comprising:
   an elongate processing vessel having a first end and a second end, for containing a processing liquid in which the food products can be processed;
   feeding means disposed at the first end of the processing vessel, the feeding means being configured for feeding the food products into the processing vessel at the first end thereof;
   a screw conveyor in the form of a rotatable flighted drum, which is located within the processing vessel for conveying the food products through the processing liquid from the first end to the second end of the processing vessel, the rotatable flighted drum comprising a cylindrical drum wall having a first end wall defining an inlet opening leading into the drum and an opposite second end wall defining an exit opening leading out of the drum, and a helical screw feed in the form of a helical screw extending inwardly from an inner side of the drum wall, the helical screw having an upstream end located adjacent the inlet opening and a downstream end located adjacent the exit opening;

guide means which is operable to guide the food products into optimal positions relative to the helical screw feed of the screw conveyer, at which the food products can be picked up by the screw conveyer; and discharge means which are disposed at the second end of the processing vessel for removing the food products from the processing vessel and for conveying the food products to a location remote therefrom, the processing apparatus being characterized in that the guide means comprises a first guiding formation extending from the upstream end of the helical screw of the flighted drum which is configured for guiding the displacement of the food products entering into the drum through the inlet opening into a first deposit zone located between a first pair of spaced adjacent helical screw portions of the helical screw at the upstream end thereof; and a second guiding formation extending from the helical screw of the flighted drum at a position downstream of the first guiding formation for guiding the displacement of the food products entering into the drum through the inlet opening to a second deposit zone located between a second pair of spaced adjacent helical screw portions of the helical screw disposed downstream of the first pair of adjacent helical screw portions of the helical screw, such that, in use rotation in a predetermined direction of the flighted drum, provides for alternately depositing the food products into the first deposit zone and the second deposit zone in an alternating fashion.

2. The processing apparatus as claimed in claim 1, wherein the feeding means comprises a feed chute including an inclined feed channel having a lower end disposed above the processing liquid at the first end of the processing vessel and an upper end into which the food products are deposited.

3. The processing apparatus as claimed in claim 2, wherein the upper end of the feed chute has an inlet opening through which processing liquid can be introduced into the feed channel for assisting in conveying food products towards the lower end thereof.

4. The processing apparatus as claimed in claim 2, wherein the feed channel defines a longitudinal axis and is dimensioned and configured so as to guide a single row of food products along the feed channel from the upper end to the lower end thereof in an arrangement wherein longitudinal axes of the food products defined along the lengths thereof, are aligned with one another and with the longitudinal axis of the feed channel.

5. The processing apparatus as claimed in claim 1, wherein the guide means includes at least one liquid jet disposed at the first end of the processing vessel, the liquid jet being operable to direct a stream of the processing liquid at the food products so as to guide the food products into optimal positions relative to the helical screw feed of the screw conveyor.

6. The processing apparatus as claimed in claim 1, wherein the discharge means is in the form of a discharge formation extending from the helical screw of the screw conveyor at the downstream end thereof, the discharge formation being operable when the flighted drum is rotated, in use, to lift the food products out of the processing liquid and deposit the food products at a location adjacent the exit opening from which the food products exit the flighted drum via the exit opening of the flighted drum.

7. The processing apparatus as claimed in claim 1, wherein the processing apparatus is in the form of a cooking apparatus for cooking food products, and wherein the processing vessel is in the form of a cooking vessel for containing a processing liquid in the form of a cooking liquid.

8. The processing apparatus as claimed in claim 1, wherein the processing apparatus is in the form of a cooling apparatus for cooling food products, and wherein the processing vessel is in the form of a cooling vessel for containing a processing liquid in the form of a cooling liquid.

9. A food processing system for processing food products, which includes a cooking apparatus as claimed in claim 8 and a cooling apparatus as claimed in claim 8.

10. A food processing system as claimed in claim 9, wherein the discharge means of the cooking apparatus is operable to convey the food products to the feeding means of the cooling apparatus.

* * * * *